United States Patent
Kim et al.

(10) Patent No.: US 10,521,038 B2
(45) Date of Patent: Dec. 31, 2019

(54) TOUCH DISPLAY DEVICE AND METHOD OF MANUFACTURING THE SAME

(71) Applicant: LG Display Co., Ltd., Seoul (KR)

(72) Inventors: Soo-Hwan Kim, Paju-si (KR); Jae-Hyun Park, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 16/127,642

(22) Filed: Sep. 11, 2018

(65) Prior Publication Data

US 2019/0079624 A1 Mar. 14, 2019

(30) Foreign Application Priority Data

Sep. 11, 2017 (KR) .................. 10-2017-0116088

(51) Int. Cl.
*G06F 3/041* (2006.01)
*G06F 3/044* (2006.01)
*G02F 1/1362* (2006.01)
*G02F 1/1368* (2006.01)
*G02F 1/1343* (2006.01)
*G02F 1/1333* (2006.01)
*G02F 1/1335* (2006.01)
*G09G 3/36* (2006.01)

(52) U.S. Cl.
CPC .......... *G06F 3/0412* (2013.01); *G02F 1/1368* (2013.01); *G02F 1/13338* (2013.01); *G02F 1/13439* (2013.01); *G02F 1/133512* (2013.01); *G02F 1/133514* (2013.01); *G02F 1/133528* (2013.01); *G02F 1/136286* (2013.01); *G06F 3/044* (2013.01); *G06F 3/0416* (2013.01); *G09G 3/3677* (2013.01); *G02F 2201/121* (2013.01); *G02F 2201/123* (2013.01); *G06F 2203/04103* (2013.01); *G09G 3/3688* (2013.01); *G09G 2310/0286* (2013.01); *G09G 2310/08* (2013.01)

(58) Field of Classification Search
CPC ...... G06F 3/0412; G06F 3/044; G06F 3/0416; G06F 2203/04103
See application file for complete search history.

(56) References Cited

U.S. PATENT DOCUMENTS 8,994,673 B2 *  3/2015  Hwang ................. G06F 3/0412
                                                      345/173
9,348,460 B2 *  5/2016  Lee ....................... G06F 3/0418
9,519,387 B2 * 12/2016  Kim ........................ G06F 3/044
(Continued)

*Primary Examiner* — Koosha Sharifi-Tafreshi
(74) *Attorney, Agent, or Firm* — Morgan, Lewis & Bockius LLP

(57) ABSTRACT

A touch display device includes: a first substrate, a plurality of gate lines and a plurality of data lines on the first substrate, and crossing each other to define a plurality of pixel regions, a plurality of thin film transistors connected to respective ones of the plurality of gate lines and the plurality of data lines, the plurality of thin film transistors being in respective ones of the plurality of pixel regions, and a plurality of bar-shaped sensing electrodes crossing the gate lines, wherein, to determine whether a touch is performed, the touch display device is configured such that: gate signals are transmitted to the plurality of gate lines, a direct current (DC) voltage is applied to the plurality of bar-shaped sensing electrodes, and a change in ripple component of the DC voltage applied to the bar-shaped sensing electrodes is received.

22 Claims, 10 Drawing Sheets

(56) References Cited

U.S. PATENT DOCUMENTS

2013/0314343 A1* 11/2013 Cho ............... G06F 3/0412
                                                345/173
2016/0180781 A1*  6/2016 Kim ............... G06F 3/0416
                                                345/212
2017/0192573 A1*  7/2017 Kim ............... G06F 3/0412

* cited by examiner

TOUCH DISPLAY DEVICE AND METHOD OF MANUFACTURING THE SAME

CROSS-REFERENCE TO RELATED APPLICATION(S)

This application claims the benefit of and priority to Korean Patent Application No. 10-2017-0116088, filed on Sep. 11, 2017, the entirety of which is hereby incorporated by reference.

BACKGROUND

1. Technical Field

The present disclosure relates to touch display device and a method of manufacturing the same, and more particularly, to a touch display device using a gate line as a touch driving electrode.

2. Discussion of the Related Art

With the rapid development of information technologies, display fields have also been rapidly developed. Flat panel display (FPD) devices having a thin profile, light weight, and low power consumption, such as liquid crystal display (LCD) devices, plasma display panel (PDP) devices, organic light-emitting diode (OLED) display devices, field emission display (FED) devices, and the like, have been introduced and rapidly substituted for the conventional cathode ray tubes (CRTs).

Recently, touch display devices (or touch screens) in which a touch panel is attached to a display panel have been receiving attention. The touch display device is used both as an output unit for displaying an image and an input unit on which a user may touch a specific portion of a displayed image to input an instruction. Touch panels of the touch display device may be divided into a pressure-sensitive type, a capacitive type, an infrared type, and an ultrasonic type according to a detection method of position information. That is, when the user touches the touch panel while looking at an image displayed on the display panel, the touch panel may detect position information of a corresponding portion and may compare the detected position information with position information of the image to recognize an instruction of the user.

The touch display device may be manufactured by attaching a separate touch panel to the display panel or integrally forming the touch panel on a substrate of the display panel. Particularly, to make a portable terminal (e.g., a smartphone and a tablet personal computer (PC)) slim, a demand is increasing for an in-cell type touch display device in which electrodes and lines included in the touch panel are integrally formed on a substrate of a display panel. In the in-cell type touch display device, touch blocks disposed in a matrix form are defined in a display area of the display panel, self-capacitive type touch electrodes are in each of the touch blocks, and the touch electrodes are connected to corresponding sensing lines.

In addition, a display period and a touch sensing period alternate in one frame of the touch display device, a common voltage is output through the sensing lines and applied to the corresponding touch electrodes in the display period, and, in the touch sensing period, a touch driving signal for touch sensing is output through the sensing line and applied to the corresponding touch electrode. For example, an advanced in-cell touch (AIT) type touch display device, as a self-capacitive type, is used in which a plurality of touch electrodes are utilized as touch electrodes in the touch sensing period and as common electrodes through which a common voltage Vcom is applied in the display period.

FIG. 1 is a view illustrating a related art touch display device.

As illustrated in FIG. 1, a related art touch display device 10 includes display touch drivers 15 and a display panel 19. The display touch driver 15 generates a data signal and a touch driving signal, transmits the data signal and the touch driving signal to the touch display panel 19, and receives a sensing signal from the display panel 19. The display touch driver 15 may include a touch read out integrated circuit (ROIC) and a set-reset integrated circuit (SR-IC) including a data driver.

The display panel 19 displays an image using the data signal and detects a touch using the touch driving signal. To this end, the display panel 19 includes a plurality of touch electrodes 17 formed in corresponding touch blocks TB and sensing lines SL connected to the plurality of touch electrodes 17 and the display touch drivers 15, wherein the plurality of sensing lines SL transmit a common voltage or a touch driving voltage from the display touch drivers 15 to the plurality of touch electrodes 17, and transmit sensing signals from the plurality of touch electrodes 17 to the display touch drivers 15.

For example, the sensing lines SL are connected to the touch electrodes 17 of the corresponding touch blocks TB via contact holes CH. In addition, because the touch blocks TB are individually driven, the number of touch sensing channels in the display touch driver 15 needs to be the same as that of the touch blocks TB.

As described above, electrical connection between the display panel 19 and the display touch drivers 15, based on the number of touch sensing channels the same as that of the touch blocks TB, is performed through a chip-on-glass (COG) or a chip-on-panel (COP) method in which the plurality of display touch drivers 15 are directly mounted on a substrate of an LCD panel. Accordingly, the display panel cannot be commonly used for both an AIT model and a non-AIT model, and manufacturing costs increase.

SUMMARY

Accordingly, the present disclosure is directed to a touch display device and a method of manufacturing the same that substantially obviate one or more of the issues due to limitations and disadvantages of the related art.

An aspect of the present disclosure is to provide a touch display device in which a number of touch sensing channels decreases to reduce manufacturing costs, and having a sharable display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a touch display device, including: a first substrate, a plurality of gate lines and a plurality of data lines on the first substrate, the plurality of gate lines and a plurality of data lines crossing each other to define a plurality of pixel regions, a plurality of thin film transistors connected to respective ones of the plurality of gate lines and the plurality of data lines, the plurality of thin film transistors being in respective ones of the plurality of pixel regions, and a plurality of bar-shaped sensing electrodes crossing the gate lines, wherein, to determine whether a touch is performed, the touch display device is configured such that: gate signals are transmitted to the plurality of gate lines, a direct current (DC) voltage is applied to the plurality of bar-shaped sensing electrodes, and a change in ripple component of the DC voltage applied to the bar-shaped sensing electrodes is received.

In another aspect, there is provided a method of manufacturing a touch display device, the method comprising: providing a first substrate; providing a plurality of gate lines and a plurality of data lines on the first substrate, the plurality of gate lines and a plurality of data lines crossing each other to define a plurality of pixel regions; providing a plurality of thin film transistors connected to respective ones of the plurality of gate lines and the plurality of data lines, the plurality of thin film transistors being in respective ones of the plurality of pixel regions; and providing a plurality of bar-shaped sensing electrodes crossing the gate lines, wherein, to determine whether a touch is performed: gate signals are transmitted to the plurality of gate lines, a direct current (DC) voltage is applied to the plurality of bar-shaped sensing electrodes, and a change in ripple component of the DC voltage applied to the bar-shaped sensing electrodes is received.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this disclosure, illustrate embodiments of the disclosure and together with the description serve to explain various principles of the disclosure.

Figure 1:
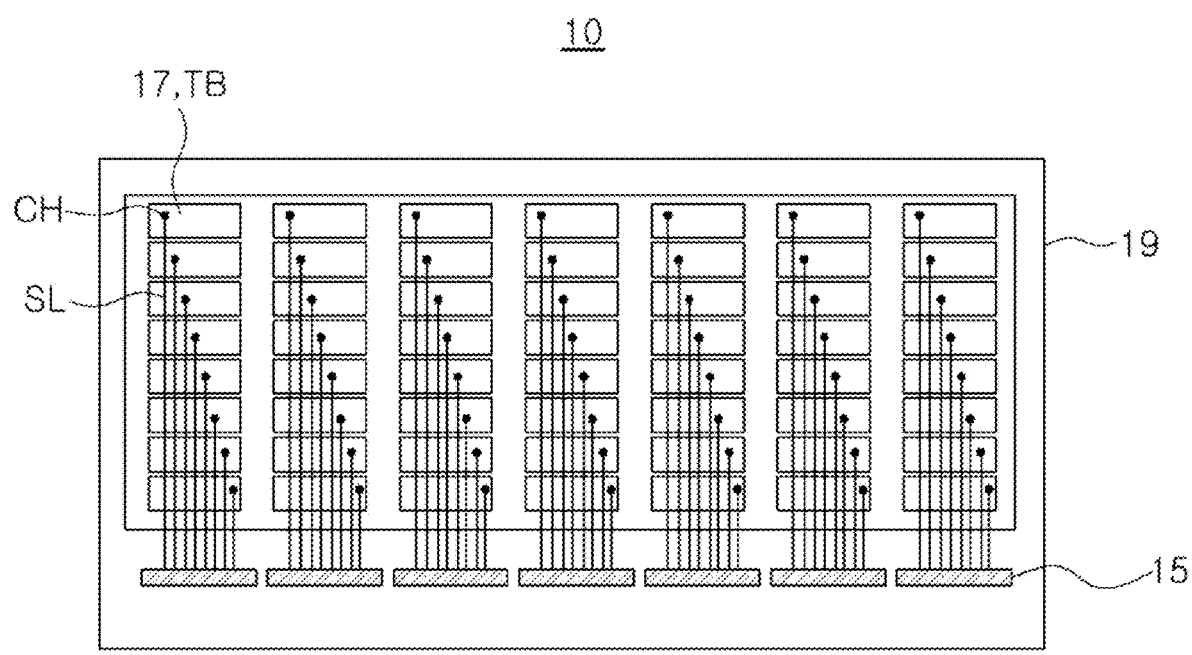
FIG. 1 is a view illustrating a related art touch display device.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present disclosure are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, example embodiments of the present disclosure will be described in detail with reference to the accompanying drawings.

While embodiments of the present disclosure may be applied to any kind of display devices using touch methods, an example of a liquid crystal display (LCD) device will be described below as a display device for convenience of description. However, the present disclosure is not limited thereto, and may be applied to other kinds of display devices such as plasma display panel (PDP) display devices, organic light-emitting diode (OLED) display devices, field emission display (FED) devices, and the like.

First Example Embodiment

Figure 2:
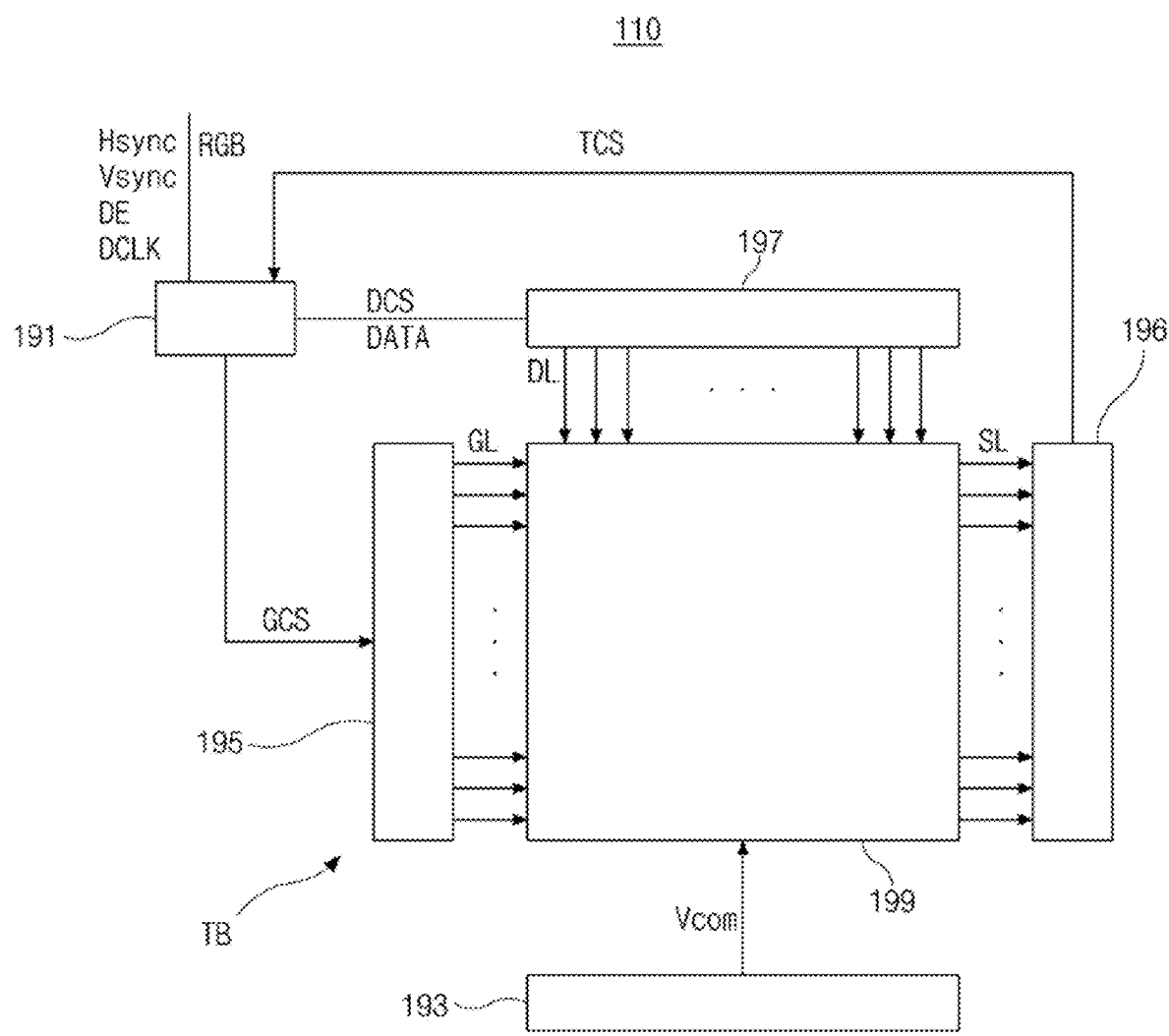
FIG. 2 is a view illustrating a structure of a touch display device according to a first example embodiment of the present disclosure.
Figure 3:
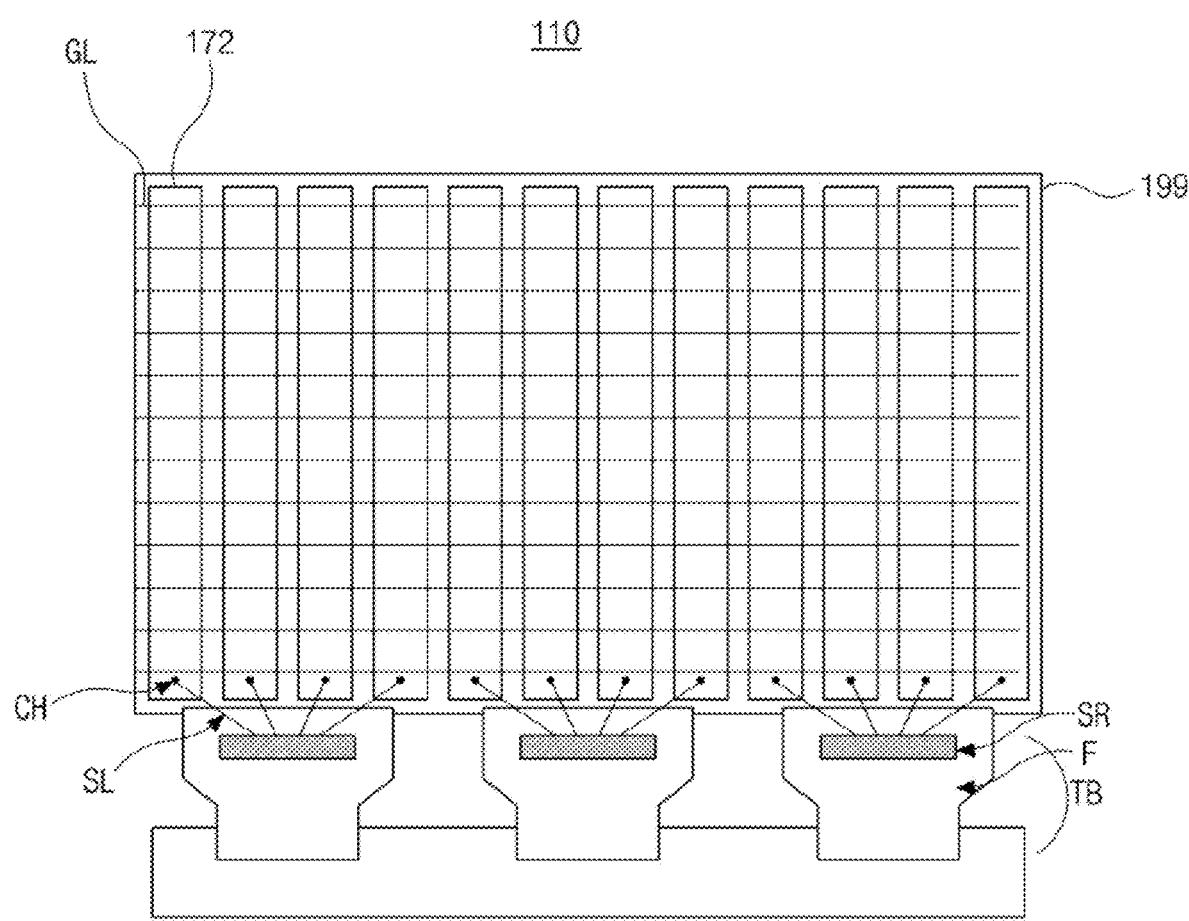
FIG. 3 is a plan view illustrating the touch display device according to the first example embodiment of the present disclosure.

FIG. 2 is a view illustrating a structure of a touch display device according to a first example embodiment of the present disclosure. FIG. 3 is a plan view illustrating the touch display device according to the first example embodiment of the present disclosure.

As illustrated in the FIG. 2 example, a touch display device 110 according to the first example embodiment of the present disclosure may include a display panel 199 for displaying an image, and a display touch driver TB for controlling the display panel 199 and detecting touches on one or more areas in a screen. For example, the touch display device 110 may include the display panel 199, in which a plurality of gate lines GL and a plurality of data lines DL may cross each other, and pixels may be defined at crossing points; a timing controller 191 for receiving timing signals and image signals RGB from an external system (not shown) to control drivers; a gate driver 195 and a data driver 197 for driving the display panel 199 through the gate lines GL and the data lines DL; a touch detecting circuit 196 for detecting a position on the display panel 199 touched by a user; and a common voltage generator 193 for supplying a common voltage Vcom to the display panel 199.

In the display panel 199, the plurality of gate lines GL may extend in a first direction on a transparent substrate, the plurality of data lines DL may extend in a second direction and cross the gate lines GL in a matrix form, and the plurality of pixel regions may be defined at the crossing points. The gate lines GL and the data lines DL may cross each other perpendicularly.

In each of the pixel regions, a thin film transistor and a liquid crystal cell controlled by the thin film transistor may be formed to display the image. When a gate signal, for example, a high level gate driving voltage VG, is applied to the thin film transistor through the gate line GL, the thin film transistor may be turned on to transmit a pixel voltage applied through the data line DL to the liquid crystal cell. In addition, when a low level gate driving voltage VG is applied to the thin film transistor through the gate line GL, the thin film transistor may be turned off to maintain a pixel voltage charged in the liquid crystal cell during one frame.

The liquid crystal cell may include a common electrode connected to the common line and a pixel electrode connected to a drain of the thin film transistor. The pixel electrode and the common electrode may form a capacitor with a dielectric interposed therebetween. In addition, the liquid crystal cell may be further connected to a storage capacitor to stably maintain a potential of the charged pixel voltage until a next frame.

The pixel may realize a grayscale output by changing an alignment state of a liquid crystal according to an electric field generated due to the pixel voltage charged through the thin film transistor and a common voltage applied to the common electrode, and adjusting light transmittance of the liquid crystal cell.

In addition, the display panel 199 may further include sensing lines SL, which may be formed on a different layer from the gate and data lines GL and DL. The sensing lines SL may transmit information of a touched position to the touch detecting circuit 196.

The timing controller 191 may receive image data DATA input from an external system (not shown) and timing signals, such as a clock signal DCLK, a horizontal synchronization signal Hsync, and a vertical synchronization signal Vsync, to generate a gate control signal GCS and a data control signal DCS. For example, the horizontal synchronization signal Hsync denotes a time for displaying one horizontal line of a screen, and the vertical synchronization signal Vsync denotes a time for displaying a screen of one frame.

In addition, the clock signal DCLK may be a reference signal for synchronizing the gate and data drivers 195 and 197 and the timing controller 191 to generate various types of signals. A data enable signal DE denotes a period in which a pixel voltage is supplied to the pixel electrode of the display panel 199. In addition, although not illustrated in the figures, the timing controller 191 may be connected to the external system (not shown) through a predetermined interface, and may receive image-related signals and timing signals output from the external system at high speed without errors. A low voltage differential signal (LVDS) type interface or a transistor-transistor logic (TTL) type interface may be used as the above-described interface.

The gate driver 195 may include a plurality of shift registers connected to the display panel 199 through the gate lines GL. The shift registers may sequentially output gate driving signals to the gate lines GL of the display panel 199 by one horizontal line according to control of the timing controller 191.

The gate driver 195 may respond to the gate control signal GCS input from the timing controller 191 to turn on the thin film transistor arranged on the display panel 199. Then, a pixel voltage having an analog waveform supplied from the data driver 197 may be applied to the liquid crystal cell connected to each thin film transistor.

The above-described gate control signal GCS may include a gate start pulse GSP, a gate shift clock GSC, a gate output enable GOE, and the like. For example, the gate start pulse GSP may be a control signal applied to a shift register for generating a first gate pulse among the plurality of shift registers forming the gate driver 195 to generate the first gate pulse, and the gate shift clock GSC may be a clock signal commonly input to all of the shift registers to shift the gate start pulse GSP. In addition, the gate output enable GOE may control outputs of the shift registers to reduce or prevent the thin film transistors corresponding to the different horizontal periods from being simultaneously turned on while overlapping.

The data driver 197 may sequentially receive image signals DATA having a digital form in response to the data control signals input from the timing controller 191, and may convert the image signals DATA into pixel voltages having an analog form with reference to a reference voltage. The pixel voltage may be latched for one horizontal period, and may be applied to the display panel 199 though all the data lines DL at once.

The above-described data control signal DCS may include a source start pulse SSP, a source shift clock SSC, a source output enable SOE, and the like. For example, the source start pulse SSP may be a signal for controlling a data sampling start timing of the data driver 197, and the source shift clock SSC may be a clock signal corresponding to a rising or falling edge to control a data sampling timing in each driving IC forming the data driver 197. In addition, the source output enable SOE may control an output timing of the data driver 197.

The touch detecting circuit 196 may be a circuit for detecting whether the display panel 199 is touched in response to a touch control signal TCS input from the timing controller 191, and for obtaining coordinates corresponding to the touch on the display panel 199. The touch detecting circuit 196 may include a low pass filter (LPF), an analog-to-digital (A/D) converter, a signal processor, a coordinate extractor, and the like.

The LPF may remove a high frequency component included in a sensing result received through the sensing line SL of the display panel 199, and may extract and output only a touch component. The A/D converter may convert an analog signal output from the LPF into a digital signal. The signal processor may be a logic circuit for detecting whether a touch point is touched in response to an output signal of the A/D converter. The coordinate extractor may be a logic circuit for extracting corresponding coordinates when the signal processor detects a touch. The common voltage generator 193 may be a circuit for supplying a common voltage signal Vcom to the common line of the display panel 199.

As illustrated in the example of FIG. 3, the touch display device 110 according to the first example embodiment of the present disclosure may include the display panel 199 and the display touch driver TB. The gate lines GL and a plurality of sensing electrodes 172, having a bar shape and intersecting with the gate lines GL, may be formed on the display panel 199. Alternatively, each of the plurality of bar-shaped sensing electrodes 172 may be disposed to cross all the gate lines on a substrate. For example, the sensing electrodes 172 of the touch display device 110 according to the first example embodiment of the present disclosure may be common electrodes.

The display touch driver TB may generate various types of signals for driving the touch display device 110, and may supply the signals to the touch display device 110 to drive the touch display device 110. In addition, the display touch driver TB may include flexible circuit films F.

For example, touch read out integrated circuits (ROIC) and set-reset integrated circuits (SR-IC) SR including data drivers may be mounted on the flexible circuit films F. That is, the flexible circuit film F may be a chip-on-film (COF) type flexible circuit film.

In addition, the plurality of common electrodes 172 may be connected to the sensing lines SL via contact holes CH, respectively. That is, the plurality of common electrodes 172 may be respectively connected to touch sensing channels of the touch ROICs through the sensing lines SL.

For example, in the touch display device 110 according to the first example embodiment of the present disclosure, the common electrodes 172 may not have a block shape, but the common electrodes 172 may have a bar shape to reduce the number of touch sensing channels. That is, because each of the plurality of bar-shaped common electrodes 172 may be connected to one sensing line SL, the number of sensing lines SL can be significantly reduced as compared to when the common electrode 172 is formed in each of the blocks. Accordingly, the number of touch sensing channels of the touch ROICs connected to the sensing lines SL can be reduced.

As described above, when the number of touch sensing channels is reduced, the SR-ICs SR may be formed in a COF type, in which SR-ICs SR are mounted on the flexible circuit film F instead of the display panel. Thus, the display panel can be commonly used for both an advanced in-cell touch (AIT) model and a non-AIT model.

For example, the plurality of common electrodes 172 may be spaced apart from each other, and may be electrically isolated from each other. In addition, each of the plurality of common electrodes 172 may include a plurality of openings OP corresponding to the pixel regions. For example, at least one insulation layer may be interposed between the plurality of gate lines GL and the plurality of common electrodes 172.

Accordingly, when the plurality of gate lines GL and the plurality of common electrodes 172 are spaced apart from each other by at least one insulation layer interposed therebetween, a capacitance may be generated between the plurality of gate lines GL and the plurality of common electrodes 172. That is, a common voltage may be supplied to the plurality of common electrodes 172 from the display touch driver TB, and gate signals may be supplied to the plurality of gate lines GL, thereby generating a capacitance between the plurality of gate lines GL and the plurality of common electrodes 172. For example, the common voltage may be a direct current (DC) voltage.

Accordingly, a touch and a touched position may be determined through a change in the capacitances between the plurality of gate lines GL and the plurality of common electrodes 172 before and after the touch is performed. In addition, the touch display device 110 according to the first example embodiment of the present disclosure may also determine the touch and the touched position through a change in ripple voltages before and after the touch is performed.

A common voltage, which may be a predetermined DC voltage, may be supplied to the plurality of common electrodes 172 at once, and gate signals may be sequentially supplied to the gate lines GL. Accordingly, due to coupling between the gate line GL and the common electrode 172, a common voltage including a ripple voltage with a relatively large peak value may be generated.

For example, the ripple voltage may be changed when a touch is performed. For example, a ripple voltage before a touch is performed can be lowered when the touch is performed. Accordingly, the display touch driver TB may receive sensing signals from the plurality of common electrodes 172 to generate a look up table LUT for ripple voltages before a touch is performed during one frame in which gate signals are sequentially applied to the plurality of gate lines GL.

In addition, the display touch driver TB may determine whether a touch is performed by comparing a sensing signal with a value stored in the LUT before the touch is performed. That is, a sensing signal having the same value as the value stored in the LUT before a touch is performed means a state in which a touch has not been performed, and a sensing signal having a value that is different from the value stored in the LUT means a state in which a touch has been performed.

When the display touch driver TB determines that a touch is performed, the display touch driver TB may detect a touched position. That is, the display touch driver TB may detect a position at which a value is different from a value stored in the LUT before a touch is performed as a touched position. For example, a sensing signal may be a detected signal received from a ripple voltage of the common electrode 172, which may be generated while gate signals are sequentially applied during one frame of the touch display device 110.

Figure 4:
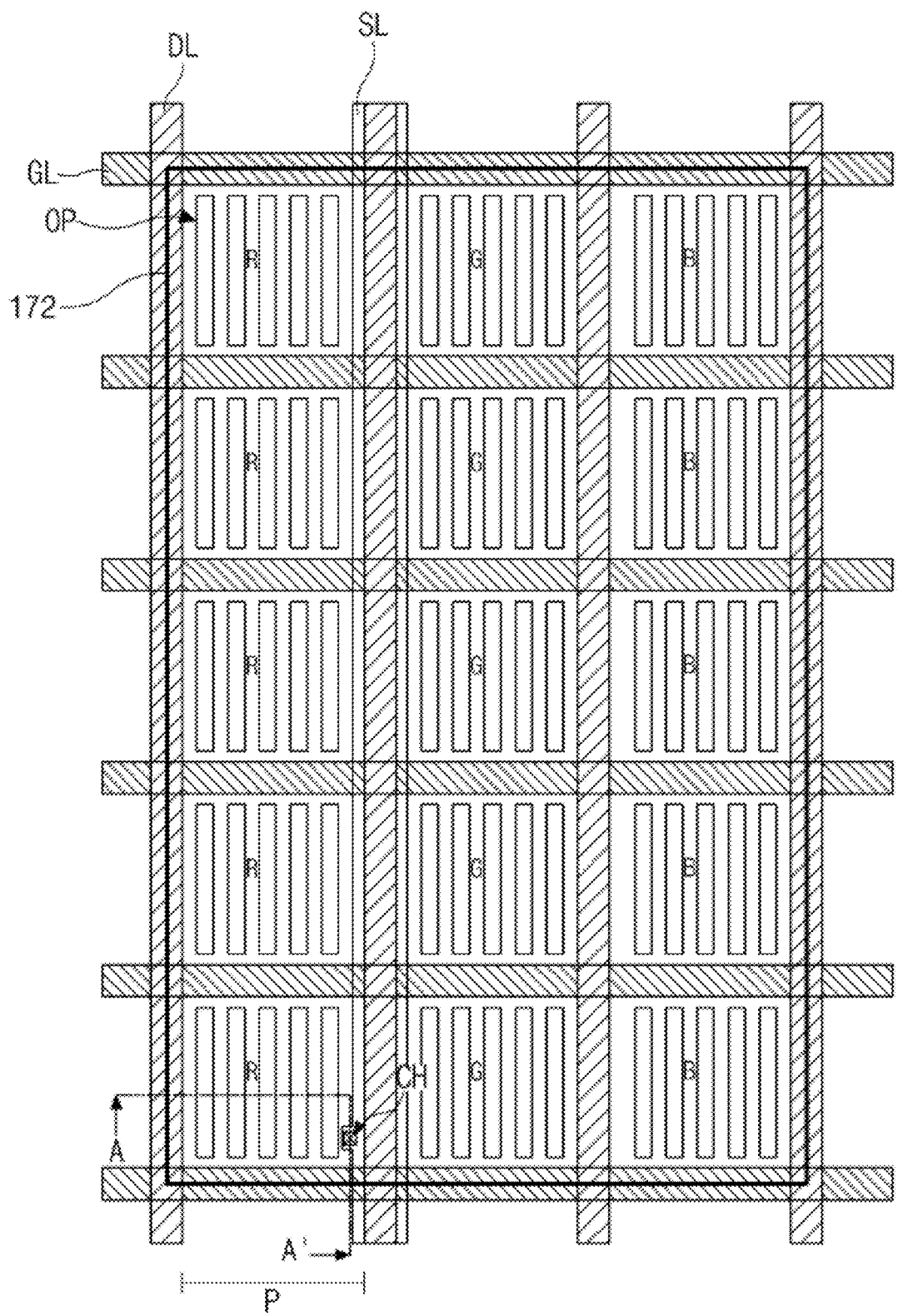
FIG. 4 is a plan view illustrating an array substrate of the touch display device according to the first example embodiment of the present disclosure.
Figure 5:
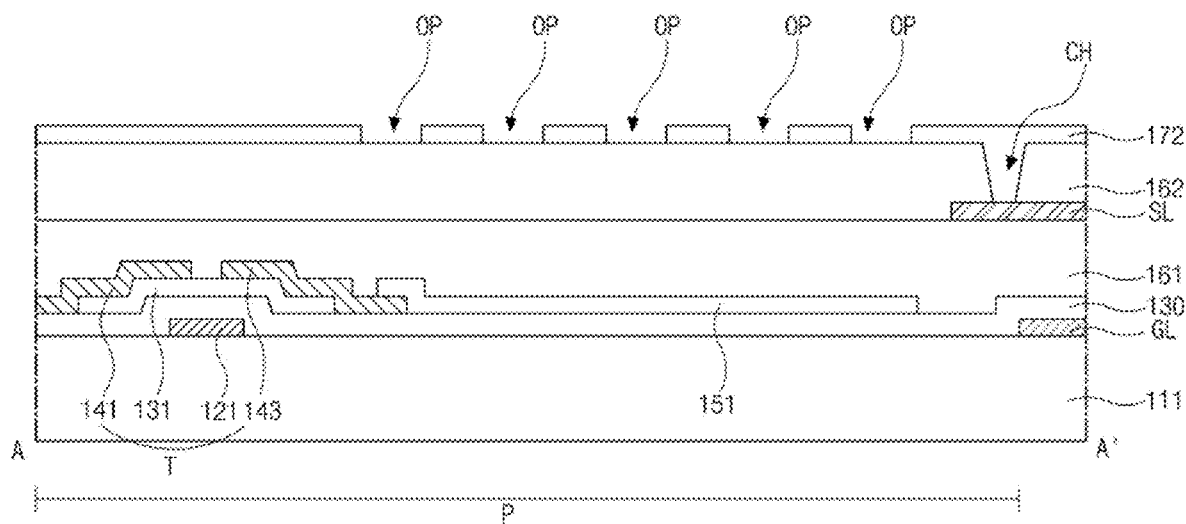
FIG. 5 is a cross-sectional view taken along line A-A' of FIG. 4.
Figure 6:
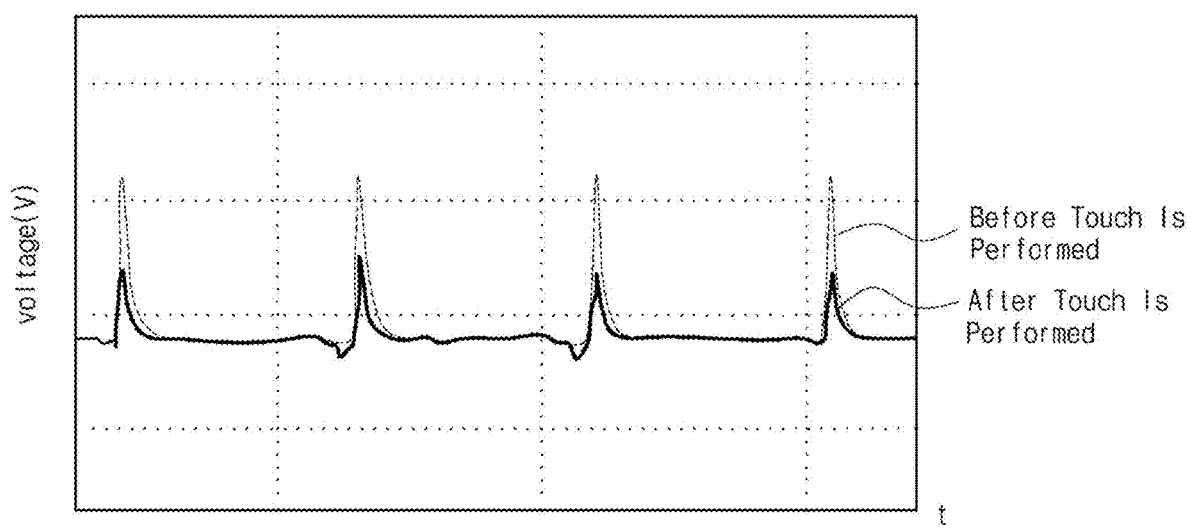
FIG. 6 is a graph showing a change in ripple voltage before and after a touch is performed.

FIG. 4 is a plan view illustrating an array substrate of the touch display device according to the first example embodiment of the present disclosure. FIG. 5 is a cross-sectional view taken along line A-A' of FIG. 4. FIG. 6 is a graph showing changes in ripple voltages before and after a touch is performed.

For example, the example of FIG. 4 shows an area in which one common electrode 172 among the plurality of bar-shaped common electrodes 172 may be disposed. The example of FIG. 5 shows a cross section of a sub-pixel.

As illustrated in the examples of FIGS. 4 and 5, the plurality of gate lines GL extending in a first direction, e.g., a row direction, may be formed on an array substrate 111 of the touch display device 110 of the FIG. 3 example. A gate insulation layer 130 may be formed on the gate lines GL, and the plurality of data lines DL extending in a second direction, e.g., a column direction, may be formed on the gate insulation layer 130.

The plurality of pixel regions P disposed in a matrix form may be defined by the gate lines GL and the data lines DL crossing each other. A thin film transistor T connected to the gate line GL and the data line DL may be formed in each of the pixel regions P.

The thin film transistor T may include a gate electrode 121 connected to the gate line GL, a semiconductor layer 131 corresponding to the gate electrode 121 and disposed on the gate insulation layer 130, and a source electrode 141 and a drain electrode 143 spaced apart from each other on the semiconductor layer 131. For example, the source electrode 141 may be connected to the data line DL.

A pixel electrode 151 connected to the drain electrode 143 of the thin film transistor T may be formed in each of the pixel regions P. In addition, an insulation layer (not shown) may also be interposed between the drain electrode 143 and the pixel electrode 151.

The plurality of bar-shaped common electrodes 172 may perpendicularly cross the gate lines GL. The plurality of bar-shaped common electrodes 172 may be over the pixel electrodes 151 with at least one insulation layer, for example, first and second passivation layers 161 and 162, interposed therebetween, thereby generating fringe fields. The openings OP corresponding to each pixel region P and facing the pixel electrode 151 may be formed in each of the plurality of bar-shaped common electrodes 172. As another example of an arrangement structure of common electrodes 172 and pixel electrodes 151, the plurality of bar-shaped common electrodes 172 may be formed in a plate shape, and the pixel electrode 151 having a plurality of openings OP may be formed over or under the common electrodes 172 with an insulation layer interposed therebetween.

The common electrode 172 and the pixel electrode 151 may include a transparent conductive material, such as indium thin oxide (ITO), indium zinc oxide (IZO), and/or indium tin zinc oxide (ITZO), although embodiments are not limited thereto. In addition, a color filter substrate (not shown) may face the array substrate 111 with a liquid crystal layer (not shown) therebetween.

For example, the common electrode 172, which may be the sensing electrode, may be between the array substrate 111 and the liquid crystal layer. At least one sensing line SL, connected to each of the plurality of bar-shaped common electrodes 172 to receive a sensing signal, may be formed on the array substrate 111 of the touch display device 110 of the FIG. 3 example. For example, the sensing line SL may extend in a direction in which the data line DL corresponding to the common electrode 172 extends, and may overlap the data line DL.

As described above, when the sensing line SL overlaps the data line DL, which may be a non-display component, reduction of an opening ratio due to the sensing line SL may be reduced or prevented, a width of the sensing line SL may be increased, e.g., as much as possible or to a maximum extent, and thus a resistance of the sensing line SL can be reduced.

At least one insulation layer, for example, the first passivation layer 161, may be between the sensing line SL and the data line DL. An insulation layer, for example, the second passivation layer 162, may be between the sensing line SL and the common electrode 172, and the sensing line SL may contact the common electrode 172 via a contact hole CH formed in the second passivation layer 162. The sensing line SL may include a low resistive metal material, such as copper (Cu) or aluminum (Al), although embodiments are not limited thereto.

For example, when the plurality of gate lines GL and the common electrodes 172 are spaced apart from each other with at least one insulation layer, such as the gate insulation layer 130 and the first and second passivation layer 161 and 162 (although embodiments are not limited thereto) therebetween, a capacitance may be generated between the plurality of gate lines GL and the plurality of common electrodes 172.

Accordingly, a touch and a touched position may be determined through a change in capacitances between the plurality of gate lines GL and the plurality of common electrodes 172 before and after the touch is performed. In addition, the touch display device 110 of the example of FIG. 3, according to the first example embodiment of the present disclosure, may also determine the touch and the touched position according to a change in ripple voltages before and after the touch is performed.

With reference to the example of FIG. 6, a common voltage, which may be a particular DC voltage, may be supplied to the plurality of common electrodes 172 at once, and gate signals may be sequentially supplied to the gate lines GL. Accordingly, due to coupling between the gate line GL and the common electrode 172, a ripple voltage having a relatively high peak value may be generated on the common voltage. For example, because the ripple voltage is reduced when a touch is performed, the display touch driver TB may determine whether a touch is performed by comparing a sensing signal received due to the ripple voltage, which may be generated when gate signals are sequentially applied, at the common electrode 172 to a value stored in the LUT before the touch is performed.

As described above, the common electrodes 172 of the touch display device 110 of the FIG. 3 example, according to the first example embodiment of the present disclosure, may not have a block shape, but the common electrodes 172 can have a bar shape, thereby reducing the number of touch sensing channels. That is, because each of the plurality of bar-shaped common electrodes 172 may be connected to one sensing line SL, the number of sensing lines SL may be significantly reduced as compared to when the common electrode 172 is formed in each of the blocks. Accordingly, the number of touch sensing channels of the touch ROICs connected to the sensing lines SL can be reduced. Accordingly, when the SR-IC is formed in a COF type, in which the SR-IC is mounted on the flexible circuit film F of the FIG. 3 example instead of the display panel, the display panel can be commonly used for both the AIT model and the non-AIT model.

In addition, because separate touch driving electrodes and separate touch sensing electrodes are not formed and a touch may be detected using the gate lines GL and the common electrodes 172, a configuration of the display touch driver TB can be simplified. In addition, because the touch display device may not be driven through a time division method, in which a display time and a touch time are divided, a memory capacity of the timing controller 191 of the FIG. 2 example can be reduced. Thus, manufacturing costs can be reduced.

Second Example Embodiment

Figure 7:
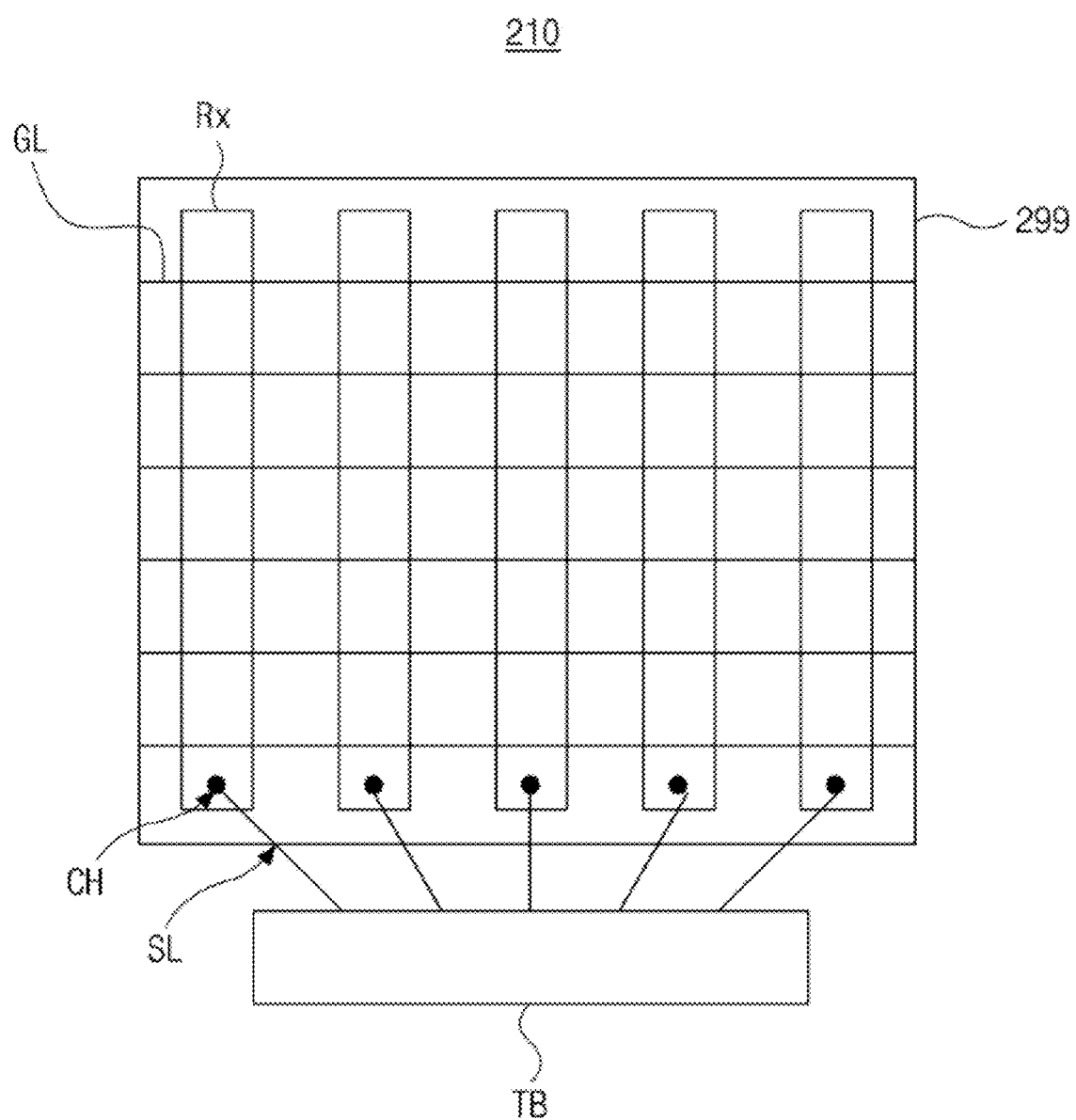
FIG. 7 is a plan view illustrating a touch display device according to a second example embodiment of the present disclosure.

FIG. 7 is a plan view illustrating a touch display device according to a second example embodiment of the present disclosure.

Hereinafter, descriptions for components that are the same as or similar to those of the first example embodiment may be omitted.

As illustrated in the example of FIG. 7, a touch display device 210 according to the second example embodiment of the present disclosure may include a display panel 299 and a display touch driver TB. Gate lines GL and a plurality of sensing electrodes RX, having a bar shape and intersecting with the gate lines GL, may be formed on the display panel 299. The plurality of sensing electrodes RX may cross the gate lines GL perpendicularly.

The display touch driver TB may generate various types of signals for driving the touch display device 210, and may supply the signals to the touch display device 210 to drive the touch display device 210. In addition, the display touch driver TB may include the flexible circuit films F of the FIG. 3 example.

For example, touch ROICs and SR-ICs including data drivers may be mounted on the flexible circuit films F of the FIG. 3 example. In addition, the plurality of sensing electrodes RX may be respectively connected to sensing lines SL via contact holes CH. That is, the plurality of sensing electrodes RX may be respectively connected to touch sensing channels of the touch ROICs through the sensing lines SL.

For example, the sensing electrodes RX of the touch display device 210 according to the second example embodiment of the present disclosure may not have a block shape, and the sensing electrodes RX may have a bar shape, thereby reducing the number of touch sensing channels. That is, when each of the plurality of bar-shaped sensing electrodes RX is connected to one sensing line SL, the number of the sensing lines SL can be significantly reduced as compared to when the sensing electrode RX is formed in each of the blocks. Accordingly, the number of touch sensing channels of the touch ROICs connected to the sensing lines SL can be reduced.

As described above, when the number of touch sensing channels is reduced, the SR-IC may be formed in a COF type, in which the SR-IC is mounted on the flexible circuit film F of the FIG. 3 example, instead of the display panel. Thus, the display panel can be commonly used for both an AIT model and a non-AIT model.

For example, the plurality of sensing electrodes RX may be spaced apart from each other, and may be electrically isolated from each other, and a DC voltage may be applied to each of the plurality of sensing electrodes RX. In addition, a capacitance may be generated between the plurality of gate lines GL and the plurality of sensing electrodes RX.

Accordingly, the display touch driver TB may detect a position touched by a user by detecting the capacitance generated between the plurality of gate lines GL and the plurality of sensing electrodes RX. In addition, the display touch driver TB may also detect a position touched by the user by detecting a change in ripple voltage generated between the plurality of gate lines GL and the plurality of sensing electrodes RX.

Accordingly, the plurality of gate lines GL may be used as driving electrodes to which sensing signals for detecting a touch may be applied. That is, when a gate signal is transmitted to a first gate line GL, the signal may be detected by checking from a first sensing electrode RX to a last sensing electrode RX to thereby determine whether a touch is performed by the user.

In addition, when a gate signal is transmitted to a second gate line GL, the signal may be detected by checking from the first electrode RX to the last sensing electrode RX. This same process may be repeated until the last gate line GL and the last sensing electrode RX are operated.

During one frame period, when a signal is detected at the sensing electrode RX from the first gate line GL to the last gate line GL, one combination of driving and receiving at each gate line GL and the sensing electrode RX may be performed. In addition, coordinates of a touch (for example, a finger touch) on the touch display device 210 may be determined through positions of the gate line GL and the sensing electrode RX perpendicularly crossing the gate line GL when the touch is detected. That is, a touch and a touched position may be determined through a change in the capacitances between the plurality of gate lines GL and the plurality of sensing electrodes RX before and after the touch is performed. In addition, the touch display device according to the second example embodiment of the present disclosure may also determine the touch and the touched position according to a change in ripple voltages before and after the touch is performed.

Figure 8:
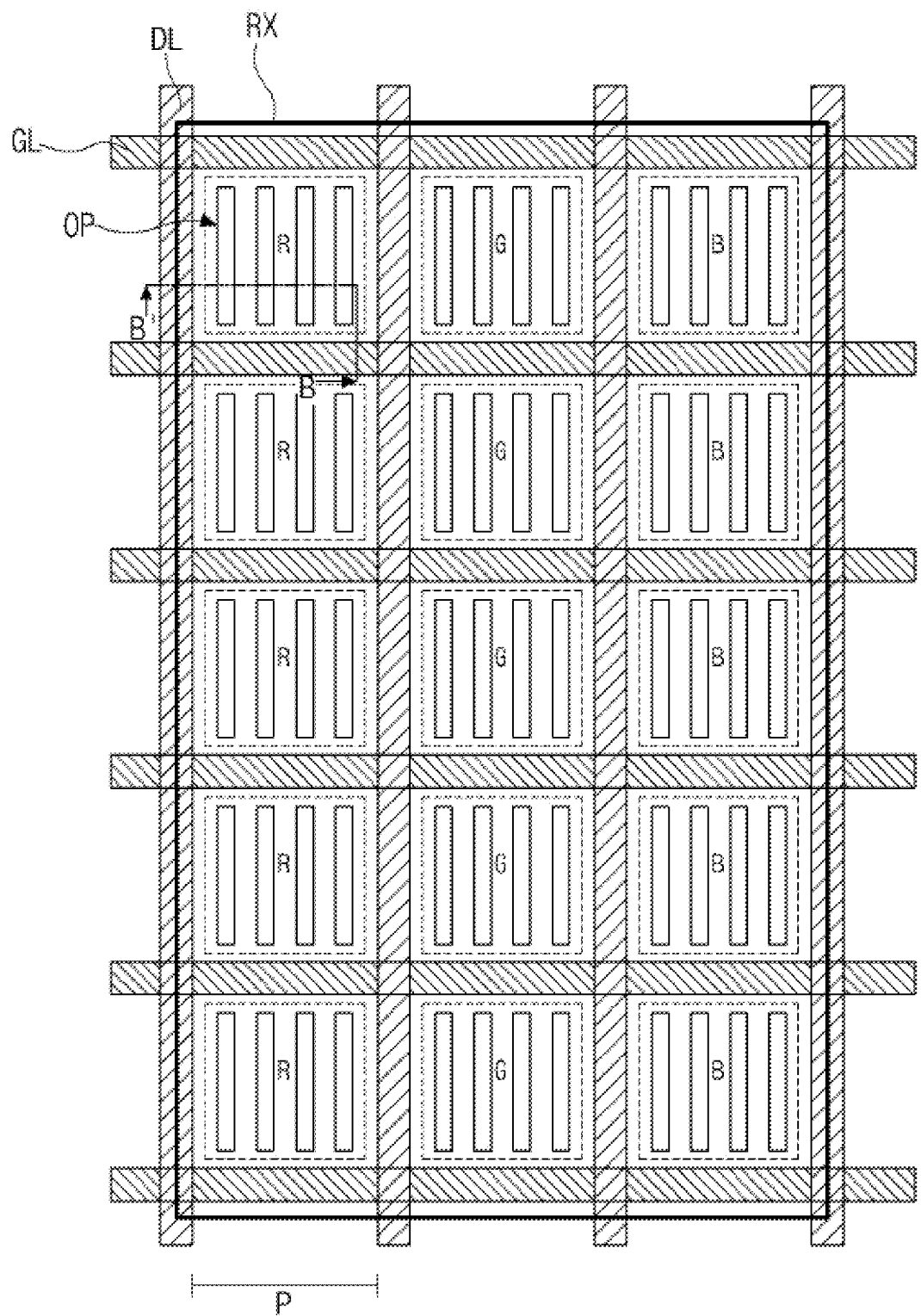
FIG. 8 is a plan view illustrating the touch display device according to the second example embodiment of the present disclosure.
Figure 9:
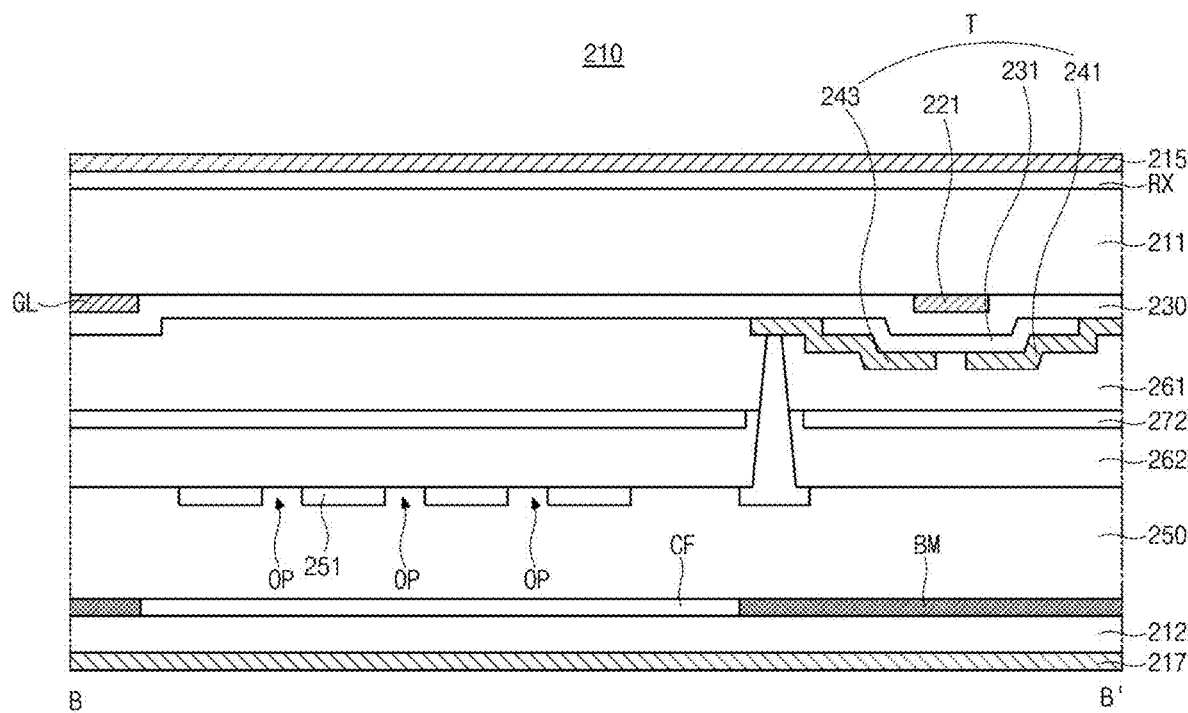
FIG. 9 is a cross-sectional view taken along line B-B' of FIG. 8.
Figure 10:
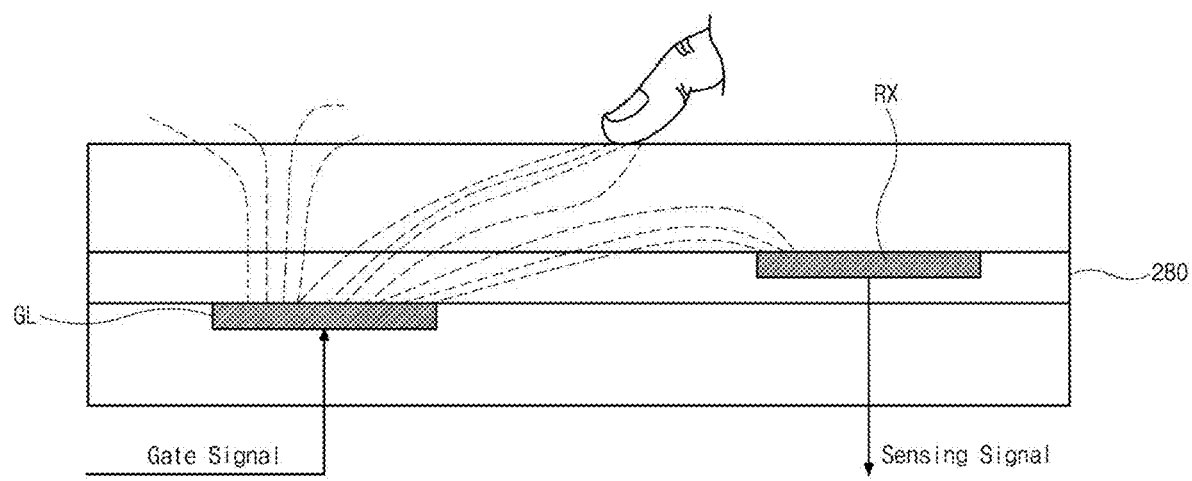
FIG. 10 is a view illustrating an operation of the touch display device according to the second example embodiment of the present disclosure.

FIG. 8 is a plan view illustrating the touch display device according to the second example embodiment of the present disclosure. FIG. 9 is a cross-sectional view taken along line B-B' of FIG. 8. FIG. 10 is a view illustrating an operation of the touch display device according to the second example embodiment of the present disclosure.

For example, the example of FIG. 8 shows one sensing electrode RX among the plurality of bar-shaped sensing electrodes RX. The example of FIG. 9 shows a cross sectional view of one sub-pixel.

As illustrated in the examples of FIGS. 8 and 9, the touch display device 210 may include an upper substrate 211, a lower substrate 212, and a liquid crystal layer 250 between the upper substrate 211 and the lower substrate 212. The upper substrate 211 may be an array substrate on which thin film transistors T may be formed, and the lower substrate 212 may be a color filter substrate on which color filters may be formed.

The plurality of gate lines GL extending in a first direction, e.g., a row direction, may be formed under the upper substrate 211, e.g., on an inner surface of the upper substrate 211 facing the lower substrate 212. A gate insulation layer 230 may be formed under the gate lines GL, and a plurality of data lines DL extending in a second direction, e.g., a column direction, may be formed under the gate insulation layer 230.

A plurality of pixel regions P disposed in a matrix form may be defined by the gate lines GL and the data lines DL crossing each other as described above. The thin film transistor T, connected to the gate line GL and the data line DL, may be formed in each of the pixel regions P.

The thin film transistor T may include a gate electrode 221 connected to the gate line GL, a semiconductor layer 231 corresponding to the gate electrode 221 and under the gate insulation layer 230, and source and drain electrodes 241 and 243 under the semiconductor layer 231 and spaced apart from each other. For example, the source electrode 241 may be connected to the data line DL.

A pixel electrode 251 connected to the drain electrode 243 of the thin film transistor T may be in each of the pixel regions P. First and second passivation layers 261 and 262 may be between the thin film transistor T and the pixel electrode 251.

The common electrode 272 may be over the pixel electrode 251 with at least one insulation layer, for example, the second passivation layer 262, interposed therebetween, e.g., to generate a fringe field. That is, openings OP corresponding to the each of the pixel regions P and facing the common electrode 272 may be formed in the pixel electrode 251. The common electrode 272 may be between the thin film transistor T and the pixel electrode 251, and the first passivation layer 261 may be between the common electrode 272 and the thin film transistor T.

The common electrode 272 and the pixel electrode 251 may include a transparent conductive material, such as ITO, IZO, or ITZO, although embodiments are not limited thereto. The lower substrate 212 may include color filters CF and black matrixes BM. In addition, a first polarizer 215 and a second polarizer 217 may be respectively on outer surfaces of the upper substrate 211 and the lower substrate 212.

For example, in the touch display device 210 according to the second example embodiment of the present disclosure, the plurality of bar-shaped sensing electrodes RX may be between the upper substrate 211 and the first polarizer 215. That is, the plurality of bar-shaped sensing electrodes RX perpendicularly crossing the gate lines GL of the upper substrate 211 may be between the first polarizer 215 and the upper substrate 211. Although a function layer above the bar-shaped sensing electrodes RX is shown in the FIG. 9 example as being the first polarizer 215, embodiments are not limited thereto. For example, the function layer above the bar-shaped sensing electrodes RX may be a buffer layer, an encapsulation layer, a protection layer, and the like.

In addition, the bar-shaped sensing electrodes RX may be at any location in the touch display device, as long as the bar-shaped sensing electrodes RX have the gate lines GL between the bar-shaped sensing electrodes RX and the common electrodes 272, and an insulation layer (not shown) between the bar-shaped sensing electrodes RX and the gate lines. Accordingly, the arrangement of the bar-shaped sensing electrodes RX in the touch display device is not limited to the example shown in FIG. 9, and those of ordinary skill in the art may employ other arrangements of the bar-shaped sensing electrodes RX.

In addition, at least one sensing line SL of the FIG. 7 example connected to the plurality of bar-shaped sensing electrodes RX to receive a sensing signal may be in the touch display device 210. Moreover, the liquid crystal layer 250 may be between the upper substrate 211 and the lower substrate 212, and an alignment state of liquid crystals between the upper substrate 211 and the lower substrate 212 may be changed to adjust transmittance of light passing through the color filters CF, thereby displaying a color image.

For example, in the touch display device 210 according to the second example embodiment of the present disclosure, when the upper substrate 211, on which the gate lines GL may be formed, is above the lower substrate 212 on which the color filters CF may be disposed, blocking of a touch signal due to the liquid crystal layer 250 can be reduced or prevented. Thus, touch sensitivity can be improved.

That is, as illustrated in the example of FIG. 10, a user may touch the upper substrate 211 with a finger or object. Accordingly, the touch and a touched position may be determined through a change in capacitances between the gate line GL, to which a gate signal is transmitted, and the plurality of bar-shaped sensing electrodes RX perpendicularly crossing the gate line GL before and after the touch is performed, with an insulating layer 280 between the gate line GL and the plurality of bar-shaped sensing electrodes RX.

As described above, in the touch display device 210 according to the second example embodiment of the present disclosure, the gate lines GL and the plurality of bar-shaped sensing electrodes RX perpendicularly crossing the gate lines GL may reduce the number of touch sensing channels as compared to when the sensing electrode RX is in each of the blocks. That is, when each of the plurality of bar-shaped sensing electrodes RX is connected to one sensing line SL, the number of sensing lines SL can be significantly reduced as compared to when the sensing electrode RX is in each of the blocks. Thus, the number of touch sensing channels of the touch ROICs connected to the sensing lines SL can be reduced.

Accordingly, because SR-IC SR of the example of FIG. 3 may be a COF type, in which the SR-IC SR is mounted on a flexible circuit film F of the FIG. 3 example, instead of the display panel 299 of the FIG. 7 example, the display panel can be commonly used for both the AIT model and the non-AIT model. In addition, when the gate lines GL are used as the touch driving electrodes without separate touch driving electrodes, a configuration of the display touch driver TB can be simplified.

In addition, when the touch display device is not driven through a time division method in which display times and touch times are divided, a memory capacity of the timing controller 191 of the FIG. 2 example can be reduced, and thus manufacturing costs can be reduced. In the present disclosure, when gate lines are used as touch driving electrodes and bar-shaped common electrodes are used as sensing electrodes or bar-shaped separate sensing electrodes are over a substrate, manufacturing costs can be reduced and a display panel can be commonly used.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A touch display device, comprising:
   a first substrate;
   a plurality of gate lines and a plurality of data lines on the first substrate, the plurality of gate lines and a plurality of data lines crossing each other to define a plurality of pixel regions;
   a plurality of thin film transistors connected to respective ones of the plurality of gate lines and the plurality of data lines, the plurality of thin film transistors being in respective ones of the plurality of pixel regions; and
   a plurality of bar-shaped sensing electrodes crossing the gate lines,
   wherein, to determine whether a touch is performed, the touch display device is configured such that:
      gate signals are transmitted to the plurality of gate lines,
      a direct current (DC) voltage is applied to the plurality of bar-shaped sensing electrodes, and
      a change in ripple component of the DC voltage applied to the bar-shaped sensing electrodes is received.

2. The touch display device of claim 1, further comprising pixel electrodes connected to the thin film transistors.

3. The touch display device of claim 1, wherein each of the plurality of bar-shaped sensing electrodes crosses all of the plurality of gate lines on the first substrate.

4. The touch display device of claim 1, further comprising a plurality of sensing lines respectively connected to the plurality of bar-shaped sensing electrodes.

5. The touch display device of claim 4, wherein:
   the sensing lines extend in a direction in which the data lines extend; and
   the sensing lines overlap the data lines.

6. The touch display device of claim 4, further comprising a display touch driver configured to:
   receive the change in ripple component of the DC voltage from the plurality of bar-shaped sensing electrodes; and
   detect position information of a touched portion.

7. The touch display device of claim 6, wherein:
   the bar-shaped sensing electrodes are common electrodes; and
   the DC voltage is a common voltage.

8. The touch display device of claim 7, further comprising an insulation layer between the common electrodes and the plurality of sensing lines, the insulation layer comprising a plurality of contact holes for connecting the common electrodes with the plurality of sensing lines.

9. The touch display device of claim 7, wherein the common electrodes are between the gate lines and a liquid crystal layer.

10. The touch display device of claim 6, further comprising:
    a second substrate under the first substrate; and
    a function layer over the first substrate,
    wherein the bar-shaped sensing electrodes are between the function layer and the first substrate.

11. The touch display device of claim 10, wherein the function layer comprises a polarizer.

12. The touch display device of claim 10, wherein the second substrate comprises:
    black matrixes; and
    color filters between the black matrixes.

13. The touch display device of claim 12, further comprising a liquid crystal layer between the first substrate and the second substrate.

14. The touch display device of claim 2, further comprising:
    a common electrode layer between the thin film transistors and the pixel electrodes; and
    at least one insulation layer between the plurality of bar-shaped sensing electrodes and the plurality of gate lines,
    wherein the plurality of gate lines are between the plurality of bar-shaped sensing electrodes and the common electrode layer.

15. A method of manufacturing a touch display device, the method comprising:
    providing a first substrate;
    providing a plurality of gate lines and a plurality of data lines on the first substrate, the plurality of gate lines and a plurality of data lines crossing each other to define a plurality of pixel regions;
    providing a plurality of thin film transistors connected to respective ones of the plurality of gate lines and the plurality of data lines, the plurality of thin film transistors being in respective ones of the plurality of pixel regions; and
    providing a plurality of bar-shaped sensing electrodes crossing the gate lines,
    wherein, to determine whether a touch is performed:
       gate signals are transmitted to the plurality of gate lines,
       a direct current (DC) voltage is applied to the plurality of bar-shaped sensing electrodes, and
       a change in ripple component of the DC voltage applied to the bar-shaped sensing electrodes is received.

16. The method of claim 15, wherein each of the plurality of bar-shaped sensing electrodes crosses all of the plurality of gate lines on the first substrate.

17. The method of claim 15, further comprising providing a plurality of sensing lines respectively connected to the plurality of bar-shaped sensing electrodes.

18. The touch display device of claim 17, wherein:
the sensing lines extend in a direction in which the data lines extend; and
the sensing lines overlap the data lines.

19. The touch display device of claim 17, further comprising providing a display touch driver configured to:
receive the change in ripple component of the DC voltage from the plurality of bar-shaped sensing electrodes; and
detect position information of a touched portion.

20. The touch display device of claim 19, wherein:
the bar-shaped sensing electrodes are common electrodes; and
the DC voltage is a common voltage.

21. The touch display device of claim 20, further comprising providing an insulation layer between the common electrodes and the plurality of sensing lines, the providing the insulation layer comprising providing a plurality of contact holes for connecting the common electrodes with the plurality of sensing lines.

22. The touch display device of claim 19, further comprising:
providing a second substrate under the first substrate; and
providing a function layer over the first substrate,
wherein the bar-shaped sensing electrodes are between the function layer and the first substrate.

\* \* \* \* \*